United States Patent [19]
Vincent et al.

[11] 3,730,152
[45] May 1, 1973

[54] ROTARY INTERNAL COMBUSTION ENGINES

[76] Inventors: Philip Conrad Vincent, 7 Kew Bridge Court W.4., London; George Amos Hinton, Stockwell Croft, Cleeve Hill, Cheltenham, both of England

[22] Filed: Feb. 19, 1971

[21] Appl. No.: 116,955

[30] Foreign Application Priority Data

Feb. 19, 1970  Great Britain...................8,078/70

[52] U.S. Cl. .............................................123/44 R
[51] Int. Cl. ...........................................F02b 57/00
[58] Field of Search...............123/44 R, 44 C, 44 D, 123/44 E

[56] References Cited

UNITED STATES PATENTS

3,581,718   6/1971   Petty..................................123/44 R

*Primary Examiner*—C. J. Husar
*Attorney*—Watson, Cole, Grindle & Watson

[57] ABSTRACT

The disclosure relates to rotary internal combustion engines in which a cylinder assemblage having radial cylinders rotates within an annular ported structure having inlet and outlet ports. A sealing member encircles the outer end of each cylinder and is mounted on the assemblage for movement towards and away from the ported structure and means are provided for maintaining sealing members at a minimum distance away from the ported structure.

18 Claims, 13 Drawing Figures

Patented May 1, 1973

Inventors
Philip Conrad Vincent
George Amos Hinton
By
Watson, Cole, Grindle & Watson

Patented May 1, 1973

Patented May 1, 1973

ROTARY INTERNAL COMBUSTION ENGINES

This invention relates to rotary internal combustion engines.

The invention provides a rotary internal combustion engine having a relatively rotating cylinder assemblage and ported structure, the cylinder assemblage having at least one cylinder containing a reciprocable piston, which cylinder is open at one end to an annular face on the ported structure around which inlet and outlet ports are spaced so that the cylinder communicates successively with the ports, said one end of the cylinder being encircled by a sealing member which is mounted on the cylinder assemblage for movement towards and away from said face of the ported structure and means being provided for maintaining the sealing member at a minimum predetermined distance from said surface of the ported structure.

Said means for maintaining the sealing member at a minimum predetermined distance from said surface of the ported structure may comprise two annular guide tracks for the sealing member on the ported structure on opposite sides of said annular surface and coaxial with the annular surface.

Parts of the sealing member may engage directly the guide tracks.

Followers may be located between the sealing member and the guide track which followers may be mounted on the cylinder assemblage for movement towards and away from the tracks on the ported structure.

Means may be provided for lubricating the tracks.

The lubricating means may comprise means for supplying oil to the tracks.

Spring means may be provided between the sealing member and cylinder assemblage for urging the sealing member towards said surface on the ported structure.

The sealing member may be mounted for universal rocking movement on the cylinder assemblage.

The sealing member may be mounted in a recess in the cylinder assemblage around said one end of the cylinder.

A coolant passage may be formed between the sealing member and a side of the recess and means are provided for supplying coolant fluid to the passage.

The cylinder assemblage may be formed with a number of spaced cylinders each having a sealing member at the end adjacent said surface on the supported structure.

The or each sealing member may partly overlie said end of the or each cylinder so that gas pressure in the cylinder urges the sealing member towards said surface on the ported structure.

The ported structure may be annular and encircle the cylinder assemblage and the cylinder or cylinders in the assemblage may extend radially with respect to the axis of relative rotation between the ported structure and cylinder assemblage and the outer face of the or each sealing is curved with the same curvature as the curvature of said surface on the ported structure.

In the case where the spacing means comprise tracks formed coaxially with the surface of the ported structure the tracks and surface may be formed by a continuous bore in the ported structure.

In the case where the cylinder assemblage rotates relative to the ported structure, loading means may be provided on the cylinder assemblage to counteract the action of centrifugal force on the sealing member or members.

The loading means for the or each sealing member may comprise at least one lever pivotally mounted intermediate of its ends on the cylinder assemblage, one end of which lever is connected to the sealing member and the other end of which lever carries a mass.

Alternatively the loading means may comprise a hydraulic ram acting between the cylinder assemblage and the or each sealing member and means to supply fluid to the ram at a pressure which rises and falls with engine speed.

Sealing segments may be mounted on the cylinder assemblage between adjacent sealing members for movement towards and away from said surface on the ported structure, the outer face of each of which segments corresponds in contour to the contour of said surface of the ported structure, spring means are provided between each segment and the cylinder assemblage to urge the segment towards said surface and means are provided for maintaining each segment at a minimum predetermined distance from said surface of the ported structure.

In the case where the ported structure is annular and encircles the cylinder assemblage which rotates with respect to the assemblage, loading means may be provided on the cylinder assemblage which act on the sealing segments to counteract the action of centrifugal force on the sealing segments.

The following is a description of some specific embodiments of the invention reference being made to the accompanying drawings in which.

Figure 1:
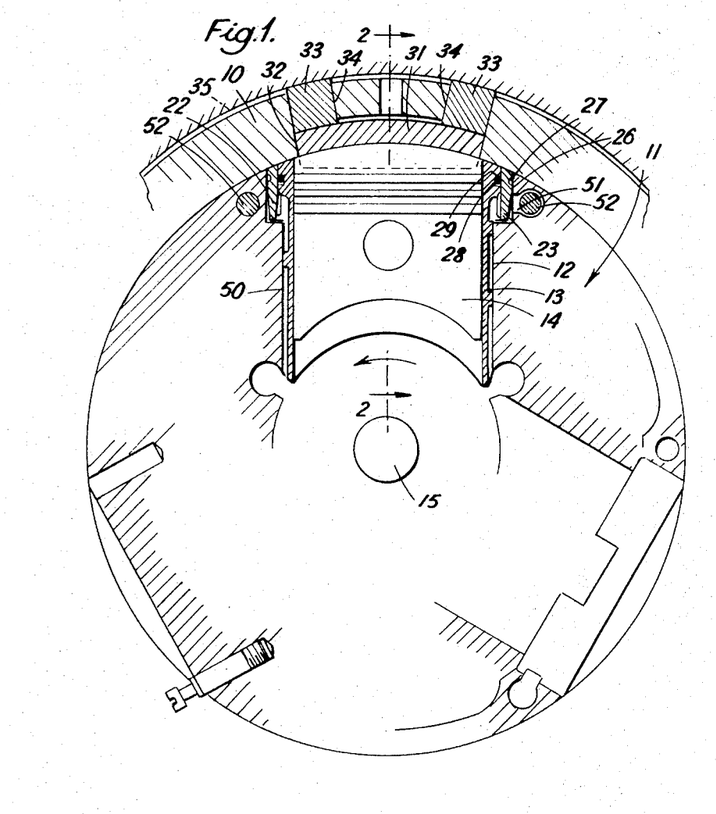
FIG. 1 is a section through a rotary internal combustion engine in a plane transverse to the engine axis.
Figure 2:
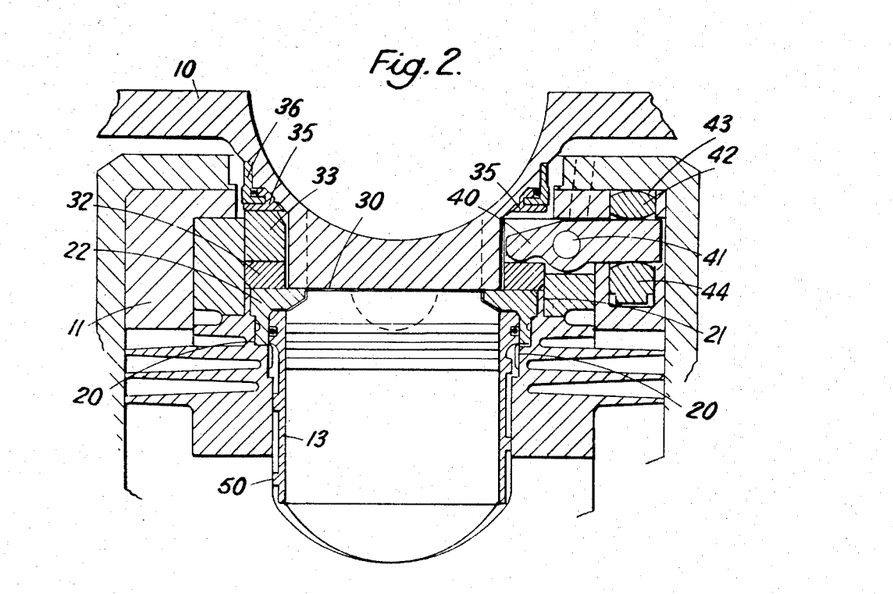
FIG. 2 is a section on the line 2—2 of FIG. 1.

Referring firstly to FIGS. 1 and 2 of the drawings there is shown a rotary internal combustion engine comprising an annular ported structure 10 around which are spaced inlet and outlet ports (not shown) for air and products of combustion respectively. Housed within the ported structure there is a cylinder assemblage 11 having an annular periphery which is closely spaced from the inner periphery of the ported structure. The cylinder assemblage is formed with three radially extending spaced bores 12 which open into the outer periphery of the assemblage. Each bore 12 contains a fixed cylinder liner 13 in which a piston 14 reciprocates. The pistons 14 are connected by conventional connecting rods to a crankshaft (not shown) which extends generally along the axis indicated at 15.

Figure 3:
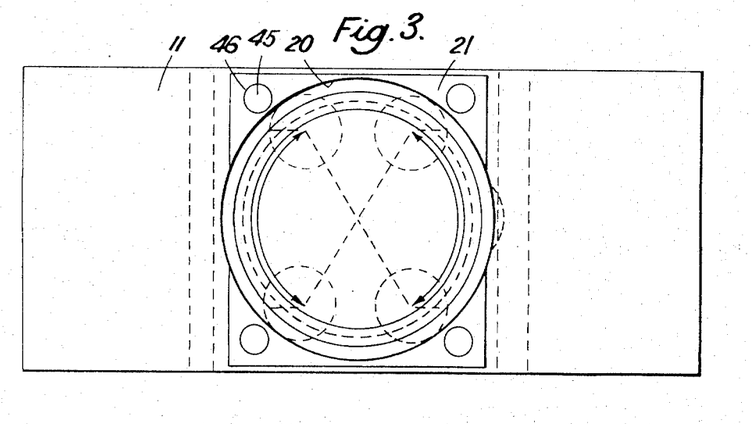
FIG. 3 is a plan view of part of the engine showing an engine cylinder with a sealing member for the cylinder removed.

The diameter of the bore 12 is increased at its outer end to provide a recess indicated at 20. As best seen in FIG. 3 the recess 20 opens into a channel 21 extending across the outer periphery of the cylinder assemblage 11, the channel being slightly wider than the bore 20. The channel 21 and bore 20 accommodate a sealing member indicated at 22 in FIGS. 1 and 2 and which is shown in greater detail in FIGS. 4 and 5. The sealing member comprises an annular cuff 23 on the outer periphery of which two flanges 24 are developed at diametrically opposite locations. At the same locations segmental shaped lips 25 are formed on the inner periphery of the cuff. In position the cuff 23 extends into the enlarged part of the bore 20 around the outer end of the cylinder liner 13 and the flanges 24 lie in the parts of the channel 21 on either side of the bore. As best seen in FIG. 1 of the drawings the outer periphery of the cuff 23 is formed with an annular groove 26 which accommodates an O-ring seal 27 which makes sealing engagement with the bore 20. The outer periphery part of the cylinder liner 13 which lies within the cuff 23 is formed with a rectangular section annular groove 28 which accommodates a piston type spring ring 29 which makes sealing engagement with the inner periphery of the cuff 23. The ring 29 and seal 27 permit the sealing member to float axially with respect to the bore and also permits the member to rock about any axis in its own plane.

Figure 4:
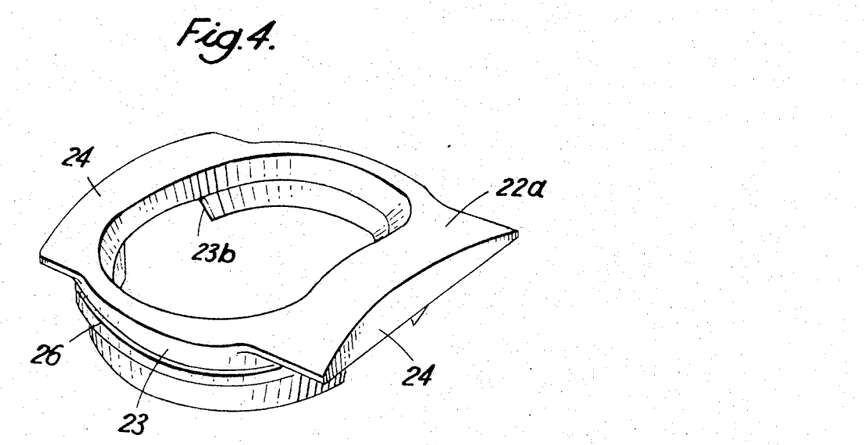
FIGS. 4 and 5 are perspective views of the sealing member.
Figure 5:
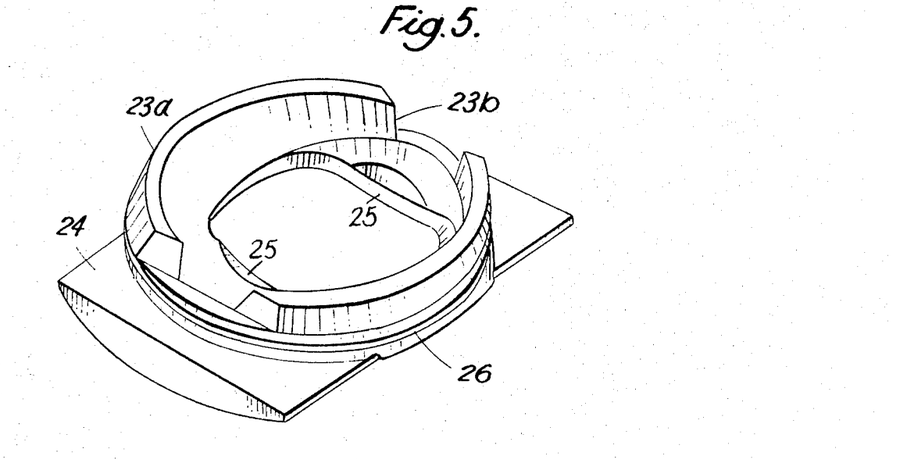

The upper face 22a of the sealing member has a part cylindrical curvature to correspond accurately to the curvature of the inner periphery of the ported structure and has a coating of tungsten carbide formed by metal spraying. The cuff 23 has a skirt 23a with two segments beneath the flanges 24 cut away as indicated at 23b because the bore 20 in which the skirt 23a is located has to stop short of cooling fins which are cut into the cylinder assemblage. These fins may, however, be dispensed with or reduced in depth so that the bore 20 can be made deeper and the skirt 23a continuous.

As best seen in FIG. 2 of the drawings the outer part of the cylinder liner 13 adjacent the sides of the cylinder assemblage 11 are cut away to accommodate the lips 25 of the sealing member which extend into the bore of the cylinder liner 13. Gas pressure in the cylinder acting on the portions of the lips which overlie the cylinder will tend to urge the sealing member towards the ported structure with a force which varies with the area of the lips overlying the cylinder. The upper faces of the lips adjacent the ported structure may also be relieved slightly to permit gas pressure to act on the upper faces of the lips to counteract the pressure on the undersides of the lips if required.

The outer surfaces of the flanges 24 are engaged by two arcuate segments 31 respectively which are located in recesses 32 formed in the cylinder assemblage. As best seen in FIG. 1 of the drawings the outer face of each arcuate segment engages adjacent each end thereof the undersides of two follower members 33 which are located in radial openings 34 in the cylinder assemblage. The outer faces of the follower members 33 engage annular tracks 35 extending around the inner periphery of the ported structure 10 and secured thereto by annular bracket members 36 which are bolted to the ported structure. The tracks 35 are shaped and dimensioned so that the outer face 22a of the sealing member is maintained at a minimal distance from the inner surface 30 of the ported structure. Thus gas losses from the cylinder when the cylinder is under pressure are reduced to a minimum. Each of the other engine cylinders has a similar sealing member.

An exceptionally fine clearance may readily be obtained between the outer surface of the sealing member and the ported structure by making the followers on a new or reconditioned engine initially too short by a very small amount (possibly as little as a fraction of a thousandth of an inch) so that they cannot lift the sealing member clear of the face on the ported structure so that these faces initially bear against one another to lap each other in. Then as the faces wear the sealing member will come to be supported by the spacing members and further wear will cease leaving the minimum possible space between the sealing surfaces. A few hours running should suffice to carry out this process.

Subsequent wear on the spacing members over long periods of running causes the sealing faces to approach closer by small amounts which cause further marginal lapping of the sealing faces which are therefore kept in close proximity through a long working life. Provided the sealing faces are very hard the sealing member being held relatively flexible against the ported structure any microscopic pieces of grit which may enter the sealing system can force the sealing member back marginally to allow the grit to roll through the seal without damage to its surfaces and escape via an exhaust port.

It will be appreciated that because of the high rotational speed of the engine a large centrifugal force will be developed which will try to force the sealing member radially outwardly. To oppose this force the upper face of each arcuate segment 31 is engaged adjacent its center by one arm of a rocker 40 which is pivoted near its center on a fixed pin 41. The other arm of the rocker engages in a piston 42 located in a bore 43 extending radially of the engine axis. As the engine rotates the piston 42 tries to move outwardly thereby causing the end of the arm 40 which engages the segment 41 to try and move inwardly and thereby to oppose outward movement of the sealing member. By suitable choice of the mass of the piston 42 the load imposed on the tracks 35 by the sealing member can be kept within a predetermined required amount.

In addition oil from the central part of the cylinder assemblage which is thus subject to increased pressure due to engine rotation may be fed through a radial passage (not shown) leading to the inner end of the cylinder 43. A part 44 of the piston 42 located in the inner end of the cylinder has a sealing ring 44 so that oil pressure will build up on the inner end of the piston 42 as the engine rotates to urge the piston radially outwardly and this will further assist in relieving the load on the tracks 35 due to the sealing members.

In order to maintain the sealing member 22 at the aforesaid minimum predetermined distance from the ported structure when the engine is stationary so the combustion pressures can be built up for starting four spring loaded plungers 45 are located in radial bores 46 in the base of the channel 21 which plungers act on the inner faces of the flanges 24 and urge the sealing member radially outwardly.

In order to cool the sealing member 22 oil from the center of the cylinder assemblage 11 is fed into a scroll-cut 50 around the outer periphery of the cylinder liner 13. The scroll-cut leads to the inner end of the skirt 23 of the sealing member from where the oil can either pass into the gap between the outer periphery of the cylinder liner 13 and the inner periphery of the skirt 23a up to the spring ring 29 or the oil can pass between the underside of the skirt 23a and the step in the cylinder bore 12 and then between the cylinder bore 20 and the outer periphery of the skirt 23a. As best seen in FIG. 1 the oil can then pass through a passage 51 cut on the trailing side of the cylinder into a bore which contains a bolt 52 which clamps various parts of the cylinder assemblage together. The oil passes along the bore to both ends from where it is passed through passages not shown outwardly onto the track 35 around which the followers 33 move. A bolt 54 similar to the bolt 52 is provided on the leading side of the engine cylinder and if additional oil flow is required for cooling the sealing member an opening would be cut between the hole for the bolt 54 and the bore 20 to permit additional oil to pass.

Figure 6:
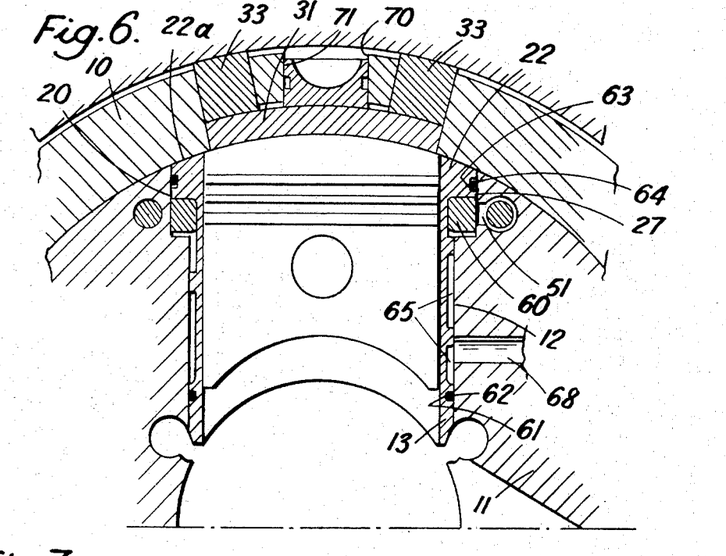
FIGS. 6 and 7 are cross-sections through parts of engines showing different forms of sealing members.

Referring now to the modified arrangement shown in FIG. 6 of the drawings the cylinder liner 13 and sealing member 22 are formed integrally with one another. The underside of the sealing member 22 is provided with cooling fins indicated at 60 which may be star shaped or fluted or of any other convenient form. The inner end of the liner 13 is formed with an annular groove 61 in which an oil seal ring 62 is located which makes sealing engagement with the inner end of the bore 12. The outer periphery of the cuff of the sealing member 22 is also formed with an annular groove 63 in which an oil sealing ring 64 is located which makes sealing engagement with the enlarged part 20 of the cylinder bore. The outer periphery of the cylinder liner 13 above the sealing ring 62 is formed with an annular space 65 which leads up to the fins 60. An oil feed passage 68 in the cylinder assemblage 11 leads from a pump (not shown) and breaks into the bore 12 opposite the annular space 65. Oil under pressure travels up the annular space 65 and over the fins 60 into the increased diameter part 20 of the bore 12. The flow of oil acts to cool the cylinder liner and sealing member 22 and also the oil pressure may tend to force the sealing member and liner outwardly towards the ported structure according to the sectional area of the oil discharge outlet from under the sealing member.

The clearance between the sealing member 22 and the bore 20 and between the cylinder liner and the bore 12 is sufficient to allow a limited universal rocking motion of the sealing member and liner relative to the axis of the cylinder so that the sealing face 22a of the sealing member 22 can follow accurately the contour of the inner periphery of the ported structure 10 across the width of the sealing face.

Instead of the system of rocker arms 40 and pistons 42 for relieving the load imparted by the slippers 33 on the tracks of the embodiment described above, from the arrangement shown in FIG. 9 cylinders 70 are formed in the cylinder assemblage between the adjacent pairs of followers 33 for each pressure segment 31. Each cylinder 70 contains a piston 71 which bears on a pressure segment 31 and oil under pressure is fed to the top of the piston 71 so as to force the piston downwardly and thereby partly to relieve the outward force imposed on the followers 33 by the pressure segment 31.

Figure 7:
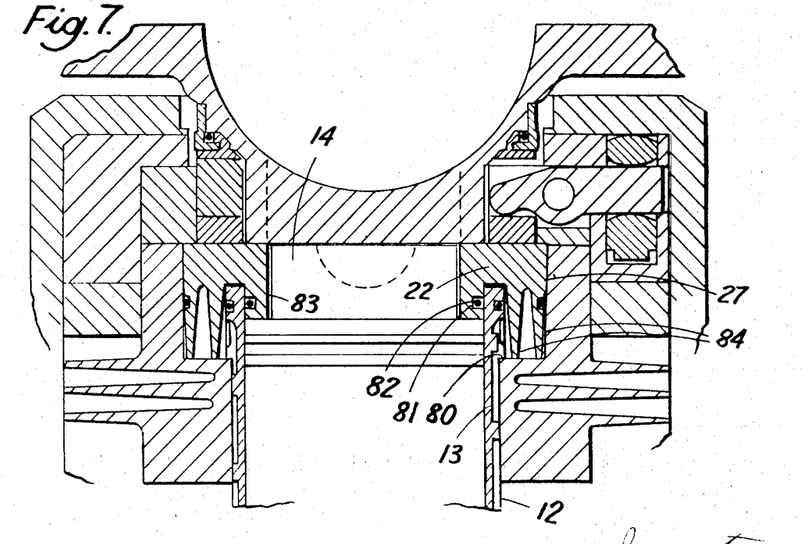

In the arrangement shown in FIG. 7 of the drawings the cylinder liner 13 stops short of the periphery of the cylinder assemblage and is formed with a step 80 around its outer periphery which rests on the step between the parts 12 and 20 of the cylinder bore to prevent inward movement of the liner. The shape of the sealing member 22 is modified so that a part of the sealing member extends over the outer end of the cylinder liner 13 and into the outer end of the liner 13. The part of the member 22 opposite the bore of the liner 12 is formed with an annular groove 81 which contains a gas sealing ring 82 which makes sealing engagement with the bore of the liner. The engine piston 14 is stepped as indicated at 83 to accommodate for the inner part of the sealing member 22. The underside of the outer part of the sealing member 22 is formed with cooling fins 84 which encircle the outer periphery of the cylinder liner 13.

Reference is now made to FIGS. 8 to 13 of the drawings which show a modified version of the engine shown in FIGS. 1 to 5. The rotary internal combustion engine comprises an annular ported structure 100 having a bore 101. The ported structure has an outlet port 102 at the top for products of combustion from the engine cylinders and an inlet port (not shown) spaced circumferentially around the ported structure from the outlet port.

Figure 8:
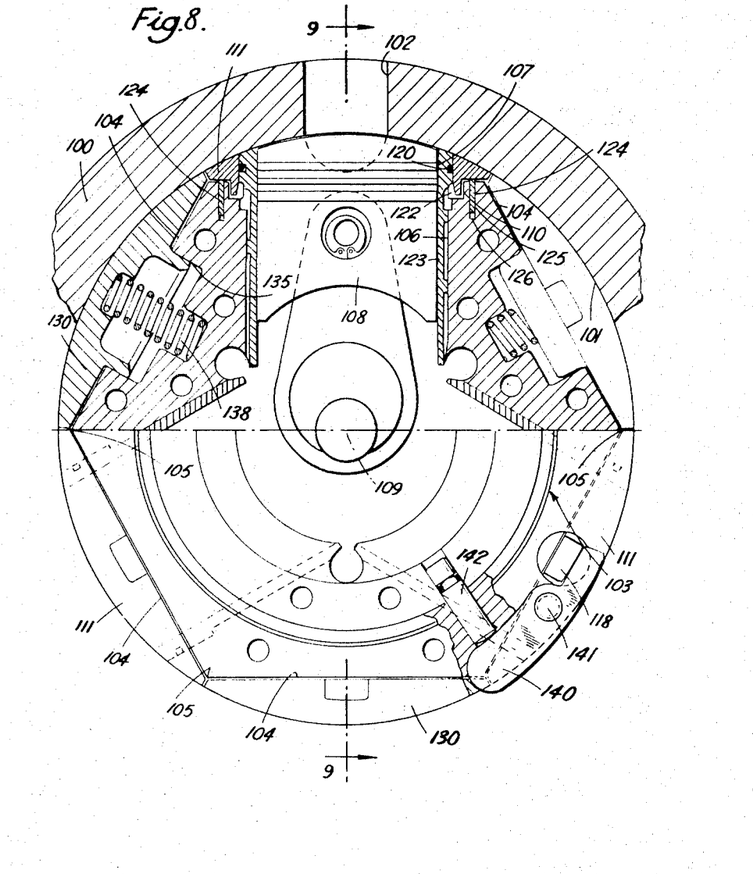
FIG. 8 is a section through an alternative construction of engine.

Housed within the ported structure there is a cylinder assemblage indicated generally at 103 which has a hexagonal outer periphery the faces of which are indicated at 104 and the corners 105 of which are spaced inwardly from the bore of the ported structure.

The cylinder assemblage is formed with three radially extending bores 106 which are spaced equally around the assemblage and open into alternate faces 104 around the assemblage. Each bore contains a fixed cylinder liner 107 in which a piston 108 reciprocates. The pistons 108 are all connected by conventional connecting rods to a crankshaft extending along the axis indicated generally at 109. The diameter of each bore 106 is increased at the outer end of the bore to provide a recess 110. A sealing member indicated at 111 extends over and just clear of the face 104 of the cylinder assemblage around the end of the cylinder, the sealing member being shown in greater detail in FIGS. 10 to 12 to which reference is now made. The sealing member comprises a rectangular block 112 which is similar in size and shape to the face 104 of the cylinder assemblage. The block has a part cylindrical upper surface 113 corresponding in radius to the radius of the bore 101 of the ported structure. The surface 113 has a coating of tungsten carbide applied by hot spraying. A skirt 114 is formed on the underside of the block the outer diameter of which skirt corresponds to the diameter of the recess 110 in the outer end of the cylinder 106. An elongated aperture 115 is cut along the block 112 within the skirt leaving two lips 117 on opposite sides of the inner periphery of the skirt. Two ears 118 project from opposite sides of the block 112 the purpose of which will be described later. Two inclined grooves 119 are cut in the upper surface of the block on either side of the aperture 115 which grooves extend along the surface to the side edges of the block. The purpose of the grooves will also be described later.

Figure 9:
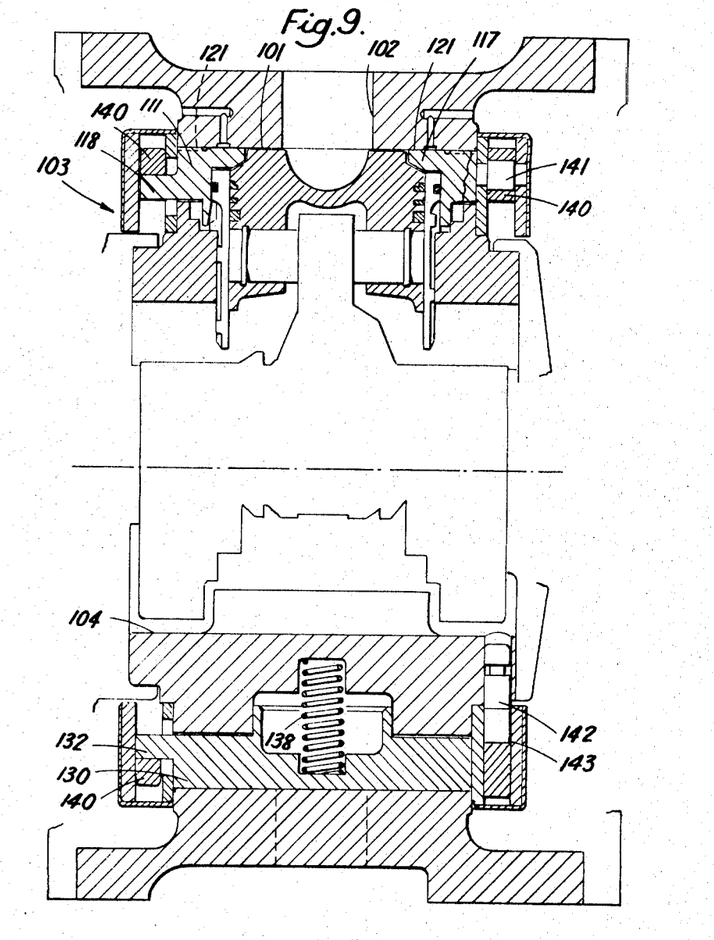
FIG. 9 is a section on the line 9 - 9 of FIG. 8.
Figure 10:
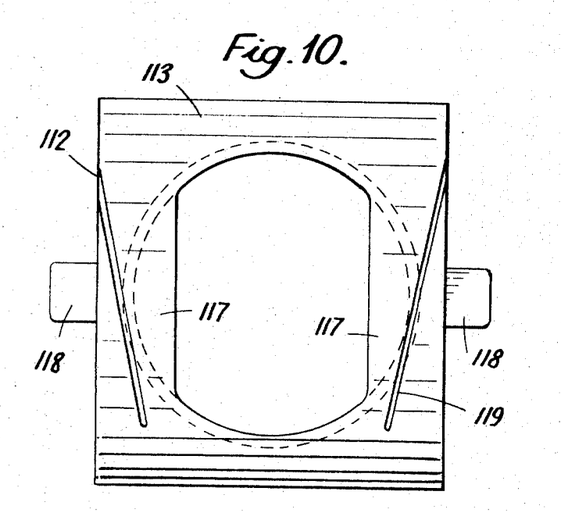
FIGS. 10 to 12 are views of a cylinder sealing member for the engine.
Figure 11:
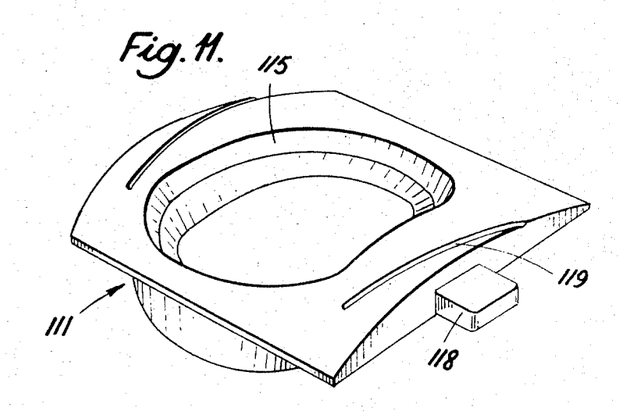
Figure 12:
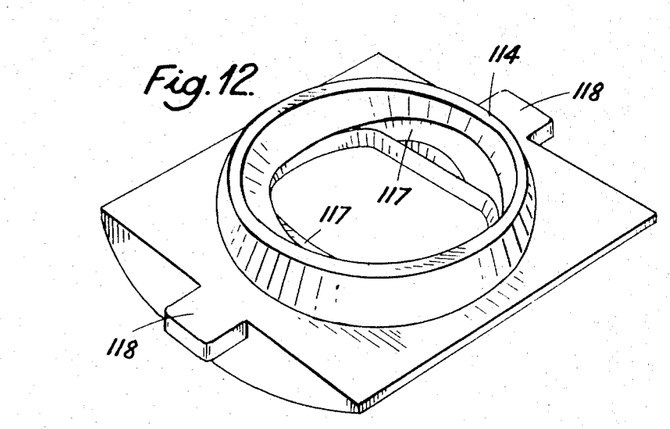

Referring again to FIGS. 8 and 9 of the drawings the sealing member 111 is shown just clear of the face 104 with the skirt 114 of the sealing member located in the recess 110. The upper end of the cylinder liner engages within the bore in the sealing member and is formed around its outer periphery with a rectangular section annular groove 120 which accommodates a piston type spring ring (not shown) which makes sealing engagement with the inner periphery of the aperture. The ring permits the sealing member to float radially with respect to the bore and also to rock about any axis in its own plane. As shown in FIG. 9 outer parts of the cylinder liner on opposite sides thereof are cut away to accommodate the lips 117 of the sealing member which lips project into the bore of the cylinder liner so that gas pressure in the cylinder acting on the undersides of the lips tends to force the sealing member outwardly towards the ported structure.

The outer faces of the sealing member on either side of the aperture 115 engage annular tracks 121 provided by the bore 101 around the ported structure. Oil which is supplied to a coolant passage around the underside of the sealing member as described later passes through drillings (not shown) extending from the underside of the sealing member to the upper face 113 of the sealing member and thence onto the tracks 121 to lubricate the tracks and thereby provide a continuous film of oil around the tracks on which the sealing member runs. Thus the outer surface of the sealing member around the aperture in the member is maintained at a minimal distance from the bore 101 of the ported structure to provide a seal against gas loss from the cylinder between the cylinder assemblage and ported structure. As the sealing member 111 moves along the tracks the inclined grooves 119 cut in the upper surface 113 of the member force oil to the sides of the sealing member in the manner of "wind back seals" to prevent oil reaching the engine cylinders. Additional grooves 119 may be provided in the surface 113. Alternatively, similar inclined grooves may be cut in the tracks 121 in place of the grooves 119 in the surface 113.

The outer periphery of the cylinder liner 107 around the skirt 114 of the sealing member is cut away to provide with the recess 110 in the cylinder assemblage a coolant passage 122 which receives oil from a scroll cut 123 around the outer periphery of the cylinder liner. To prevent this oil leaking along the face 104 of the cylinder assemblage sealing strips 124 are mounted in grooves 125 cut in the face of the cylinder assemblage which sealing strips are urged by wavy strip springs 126 into engagement with the underside of the sealing member 111. The outward force on the sealing member by the springs 126 also ensures that the sealing member is engaged with the tracks 121 on the ported structure even when the engine is stationary so that combustion pressures can be built up for starting the engine.

Figure 13:
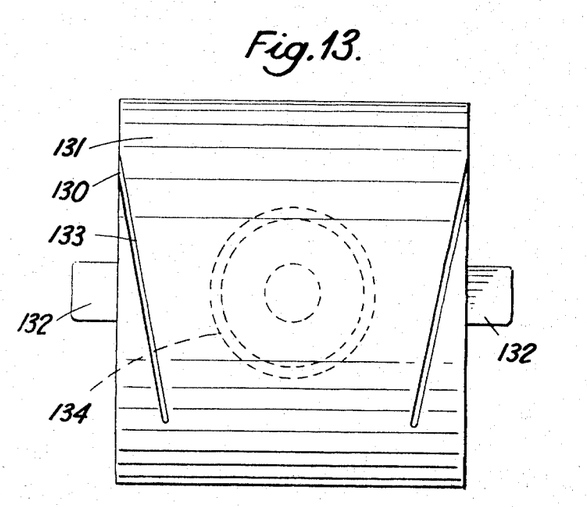
FIG. 13 is a plan view of an inter-cylinder sealing segment.

Mounted close to the faces 104 of the cylinder assemblage between the sealing members there are solid sealing segments 130 one of which is shown in greater detail in FIG. 13. The segment has a part cylindrical surface 131 the radius of which is identical to the radius of the bore 101 in the ported structure. The segment has outwardly projecting ears 132 on either side thereof similar to the ears 118 on the sealing members and has inclined grooves 133 cut in the upper surface of the segment similar to the grooves 119 in the sealing members. The underside of the sealing member is formed with a small depending skirt 134 which engages in a recess 135 cut in the face 104 of the cylinder assemblage and a powerful coil spring acts between the underside of the segment and the cylinder assemblage to urge the segment towards the ported structure. The sealing segments run on the tracks 121 on the ported structure in a similar manner to the sealing members and thus passage of gas through parts between adjacent sealing members is prevented.

To counteract centrifugal force on both the sealing members and sealing segments at high speed which would otherwise induce high wear of the tracks and the members a pair of rockers 140 are pivotally mounted on pivot pins 141 on the cylinder assemblage on opposite sides of each sealing member and sealing segment. One end of each rocker engages over the ear 118 on the sealing member or the ear 132 on the sealing segment and the other end of each rocker engages a piston 142 located in a radial bore 143 in the cylinder assemblage. As the engine rotates centrifugal force on the piston 142 tends to counteract centrifugal force on the sealing member or sealing segment. In addition oil from the central part of the cylinder assemblage may be fed through a radial passage ( not shown ) leading to the inner end of the cylinder so that as the speed of the engine increases the oil pressure will rise and increase the outward force on the piston to assist in relieving the load imposed by the sealing member on the ported structure but not so great as to lift the sealing member away from the ported structure.

We claim:

1. A rotary internal combustion engine having a relatively rotating cylinder assemblage and ported structure, the cylinder assemblage having at least one cylinder containing a reciprocable piston, which cylinder is open at one end to an annular face on the ported structure around which inlet and outlet ports are spaced so that the cylinder communicates successively with the ports, said one end of the cylinder being encircled by a sealing member which is mounted on the cylinder assemblage for movement towards and away from said face of the ported structure and two annular guide tracks on the ported structure on opposite sides of said annular surface and co-axial with the annular surface for maintaining the sealing member at a minimum predetermined distance from said surface of the ported structure.

2. An engine as claimed in claim 1 wherein parts of the sealing member directly engage the guide tracks.

3. An engine as claimed in claim 1 wherein followers are located between the sealing member and the guide track which followers are mounted on the cylinder assemblage for movement towards and away from the tracks on the ported structure.

4. An engine as claimed in claim 1 wherein means are provided for lubricating the tracks.

5. An engine as claimed in claim 4 wherein the lubricating means comprise means for supplying oil to the tracks.

6. An engine as claimed in claim 1 wherein spring means are provided between the sealing member and the cylinder assemblage for urging the sealing member towards said surface on the ported structure.

7. An engine as claimed in claim 1 wherein the sealing member is mounted for universal rocking movement on the cylinder assemblage.

8. An engine as claimed in claim 1 wherein the sealing member is mounted in a recess in the cylinder assemblage around said one end of the cylinder.

9. An engine as claimed in claim 8 wherein a coolant passage is formed between the sealing member and a side of the recess and means are provided for supplying coolant fluid to the passage.

10. An engine as claimed in claim 1 wherein the cylinder assemblage is formed with a number of spaced cylinders each having a sealing member at the end adjacent said surface on the ported structure.

11. An engine as claimed in claim 1 wherein the or each sealing member partly overlies said end of the or each cylinder so that gas pressure in the cylinder urges the sealing member towards said surface on the ported structure.

12. An engine as claimed in claim 1 wherein the ported structure is annular and encircles the cylinder assemblage and the cylinder or cylinders in the assemblage extend radially with respect to the axis of relative rotation between the ported structure and cylinder assemblage and the outer face of the or each sealing member is curved with the same curvature as the curvature of said surface on the ported structure.

13. An engine as claimed in claim 12 and in the case where the spacing means comprise tracks formed coaxially with the surface of the ported structure wherein the tracks and surface are formed by a continuous bore in the ported structure.

14. An engine as claimed in claim 12 and in the case where the cylinder assemblage rotates relative to the ported structure wherein loading means are provided on the cylinder assemblage to counteract the action of centrifugal force on the sealing member or members.

15. An engine as claimed in claim 14 wherein the loading means for the or each sealing member comprises at least one lever pivotally mounted intermediate of its ends on the cylinder assemblage, one end of which lever is connected to the sealing member and the other end of which lever carries a mass.

16. An engine as claimed in claim 14 wherein the loading means comprises a hydraulic ram acting between the cylinder assemblage and each sealing member and means to supply fluid to the ram at a pressure which rises and falls with engine speed.

17. An engine as claimed in claim 10 wherein sealing segments are mounted on the cylinder assemblage between adjacent sealing members for movement towards and away from said surface on the ported structure, the outer face of each of which segments corresponds in contour to the contour of said surface of the ported structure, spring means are provided between each segment and the cylinder assemblage to urge the segment towards said surface and means are provided for maintaining each segment at a minimum predetermined distance from said surface of the ported structure.

18. An engine as claimed in claim 17 and in the case where the ported structure is annular and encircles the cylinder assemblage which rotates with respect to the assemblage wherein loading means are provided on the cylinder assemblage which acts on the sealing segments to counteract the action of centrifugal force on the sealing segments.

* * * * *